United States Patent
Grillanda et al.

(10) Patent No.: US 11,372,157 B2
(45) Date of Patent: Jun. 28, 2022

(54) INTEGRATED OPTICAL MULTIPLEXER / DEMULTIPLEXER WITH THERMAL COMPENSATION

(71) Applicant: Nokia Solutions and Networks Oy, Espoo (FI)

(72) Inventors: Stefano Grillanda, Springfield, NJ (US); Ting-Chen Hu, Westfield, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/038,379

(22) Filed: Sep. 30, 2020

(65) Prior Publication Data

US 2022/0099890 A1   Mar. 31, 2022

(51) Int. Cl.
*G02B 6/12* (2006.01)

(52) U.S. Cl.
CPC ..... *G02B 6/12026* (2013.01); *G02B 6/12016* (2013.01); *G02B 6/12028* (2013.01); *G02B 2006/1204* (2013.01); *G02B 2006/12061* (2013.01)

(58) Field of Classification Search
None
See application file for complete search history.

(56) References Cited

U.S. PATENT DOCUMENTS

| | | | |
|---|---|---|---|
| 6,137,939 A | 10/2000 | Henry et al. | |
| 6,987,895 B2 | 1/2006 | Johannessen | |
| 7,519,257 B2 | 4/2009 | Lipson et al. | |
| 7,689,072 B2 | 3/2010 | Bulthuis et al. | |
| 7,693,384 B2 | 4/2010 | Lee et al. | |
| 9,057,839 B2 | 6/2015 | Rasras | |
| 9,110,221 B2 | 8/2015 | Agarwal et al. | |
| 9,360,627 B2 | 6/2016 | Bi et al. | |
| 10,295,739 B2 | 5/2019 | Lipson et al. | |
| 2002/0122650 A1* | 9/2002 | Kominato | G02B 6/105 385/131 |

(Continued)

FOREIGN PATENT DOCUMENTS

| | | | |
|---|---|---|---|
| CN | 1402070 A | * | 3/2003 |
| CN | 110376677 A | * | 10/2019 |

(Continued)

OTHER PUBLICATIONS

Y. Kokubun et al. Temperature-independent narrowband optical filter at 1.3 μm wavelength by an athermal waveguide. Electronics Letters, vol. 32 No. 21, Oct. 10, 1996. (Year: 1996).*

(Continued)

*Primary Examiner* — Michael Stahl
(74) *Attorney, Agent, or Firm* — Stratford Group Ltd.

(57) ABSTRACT

Photonic integrated circuits utilizing interferometric effects, such as wavelength multiplexers/demultiplexers, include a free-space coupling region having two core layers that have thermo-optic coefficients of opposite sign. The two core layers are configured to provide athermal or nearly-athermal operation. Described examples include integrated array waveguide grating devices and integrated echelle grating devices. Example material systems include LNOI and SOI.

20 Claims, 6 Drawing Sheets

(56) References Cited

U.S. PATENT DOCUMENTS

| | | | | |
|---|---|---|---|---|
| 2002/0186943 A1* | 12/2002 | Satzke | ................... | G02B 6/122 385/127 |
| 2006/0198579 A1 | 9/2006 | Bulthuis et al. | | |
| 2008/0037936 A1* | 2/2008 | Lee | .................... | G02B 6/12028 385/37 |
| 2014/0212104 A1* | 7/2014 | Cho | ....................... | G02B 6/122 385/131 |

FOREIGN PATENT DOCUMENTS

| | | | |
|---|---|---|---|
| KR | 10-2005-0114913 A | * | 12/2005 |
| WO | WO2011108617 A1 | | 9/2011 |

OTHER PUBLICATIONS

Athermal Waveguides for Temperature-Independent Lightwave Devices, Yasuo Kokubun, Norihide Funato, and Masanori Takizawa, IEEE Photonics Technology Letters, vol. 5, No. 11, Nov. 1993, p. 1297.
He, M., Xu, M., Ren, Y. et al. High-Performance Hybrid Silicon and Lithium Niobate Mach-Zehnder Modulators for 100 Gbit/s-1 and Beyond. Nat. Photonics 13, 359-364 (2019). https://doi.org/10.1038/s41566-019-0378-6.

\* cited by examiner

INTEGRATED OPTICAL MULTIPLEXER / DEMULTIPLEXER WITH THERMAL COMPENSATION

TECHNICAL FIELD

The present disclosure relates to integrated photonic circuits and in particular to components thereof with enhanced temperature stability.

BACKGROUND

Optical communication systems, such as long-haul transmission systems, datacenters, and access networks, may use wavelength division multiplexing to transmit information. The tasks of wavelength multiplexing and demultiplexing in such networks may be performed by photonic integrated circuits (PICs) utilizing interferometric effects. However, behavior and/or characteristics of such PICs may change in the presence of environmental temperature variations and thermal fluctuations, as the refractive index of materials used in a PIC is typically temperature-dependent. Temperature changes lead to changes in the refractive index of the materials that compose these circuits, and, as a consequence, to changes in phase conditions within the device, thereby affecting its transfer function.

Typically, the temperature of integrated photonic devices and circuits is regulated through the use of heaters or thermo-electric coolers (TEC). These approaches enable to tune and stabilize the circuit transfer function in the presence of temperature variations. However, active temperature stabilization techniques consume power and may require complex electronic circuitry to be integrated with the photonic chip.

SUMMARY

Embodiments described herein relate to photonic integrated circuits including a free-space coupling region comprising two or more core layers having thermo-optic coefficients of opposite signs for reducing temperature sensitivity of light propagation in the free-space coupling region.

An aspect of the present disclosure provides a photonic integrated circuit (PIC), comprising a first free-space coupling region comprising two core layers disposed one over the other, and a plurality of waveguides optically connected to the first free-space coupling region. The two core layers have thermo-optic coefficients of opposite signs for supporting thermally-compensated operation of the first free-space coupling region.

An aspect of the present disclosure provides a photonic integrated circuit (PIC), comprising: a substrate having a planar surface; a first free-space coupling region located along the planar surface, the first free-space coupling region comprising a vertical stack of two or more adjacent optical core layers over the planar surface; and a plurality of optical planar waveguides being physically and optically end-connected to the first free-space coupling region and located along the planar surface. The two adjacent core layers have thermo-optic coefficients of opposite sign. In some implementations the substrate may include an optical cladding adjacent the vertical stack. In some implementations at least one of the plurality of waveguides may comprise a vertical stack of two adjacent core layers of differing widths to define a strip-loaded waveguide and having thermo-optic coefficients of opposite signs.

In some implementations the PIC may comprise a second free-space coupling region located along the planar surface, and a planar optical waveguide array optically connecting the first free-space coupling region to the second free-space coupling region. In some implementations the waveguide array may be comprised in the plurality of waveguides. In some implementations the waveguide array may comprise waveguides of different lengths to form an array waveguide grating (AWG). In some implementations the PIC may further comprise at least one output waveguide being physically and optically end-coupled to the second free-space coupling region and having an end facing ends of the waveguides of the planar optical waveguide array. In any one of these or other implementations the second free-space coupling region may comprise a vertical stack of two or more adjacent optical core layers having thermo-optic coefficients of opposite sign. In any of these or other implementations at least one waveguide of the waveguide array may comprise two adjacent optical core layers having thermo-optic coefficients of opposite sign.

In some implementations the first free-space coupling region may comprise a diffraction grating, and the plurality of waveguides may comprise at least one first waveguide and a plurality of second waveguides. The diffraction grating may be configured to optically couple individual ones of the second waveguides to the first waveguide at different wavelengths.

In any one of the above or other implementations one of the two core layers may extend beyond the first free-space coupling region. In some of the above or other implementations the vertical stack may comprise at least three optical core layers.

In some of the above or other implementations one of the two core layers may comprise lithium niobate (LiNbO3). In some of such implementations the other of the two core layers may comprise a material having a negative thermo-optic coefficient such as titanium dioxide (TiO2). In some of such implementations the PIC may be configured to function as a wavelength-selective optical routing device, such as MUX/DEMUX, having a transmission function that shifts by less than about 1 GHz per temperature change of one degree Kelvin in an operating wavelength range of the PIC at room temperature.

In some of the above or other implementations one of the two core layers may comprise silicon. In some of such implementations the other of the two core layers may comprise at least one of titanium dioxide (TiO2) or a polymer material having a negative thermo-optic coefficient. In some of such implementations the PIC may be configured to function as a wavelength-selective optical routing device, such as MUX/DEMUX, having a transmission function that shifts by less than about 3 GHz per temperature change of one degree Kelvin in an operating wavelength range of the PIC at room temperature.

In some of the above or other implementations one of the two core layers may comprise germanium doped silica (SiO2:Ge). In some of such implementations the other of the two core layers may comprise a polymer material having a negative thermo-optic coefficient. In some of such implementations the PIC may be configured to function as a wavelength-selective optical routing device, such as MUX/DEMUX, having a transmission function that shifts by less than about 0.3 GHz per temperature change of one degree Kelvin in an operating wavelength range of the PIC at room temperature.

An aspect of the present disclosure provides a wavelength multiplexing/demultiplexing device, comprising: a substrate; a first cladding layer disposed over the substrate and having a planar surface; a first core layer disposed over the planar surface of the first cladding layer and having a positive thermo-optic coefficient; and a second core layer disposed over and in contact with the first core layer and having a negative thermo-optic coefficient. At least the second core layer may be patterned to define at least one free-space coupling region and a plurality of waveguides optically end-coupled thereto.

In some implementations of the wavelength multiplexing/demultiplexing device, the first core layer may comprise lithium niobate. In some implementations the second core layer may comprise titanium oxide. In some implementations the first cladding layer may comprises silicon dioxide. In some implementations the substrate may comprises one of lithium niobate or silicon.

BRIEF DESCRIPTION OF THE DRAWINGS

Example embodiments will now be described in conjunction with the drawings, which are not to scale, in which like elements are indicated with like reference numerals, and in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Reference throughout this specification to "one embodiment" or "an embodiment" means that a particular feature, structures, or characteristics may be combined in any suitable manner in one or more embodiments.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

Figure 1:
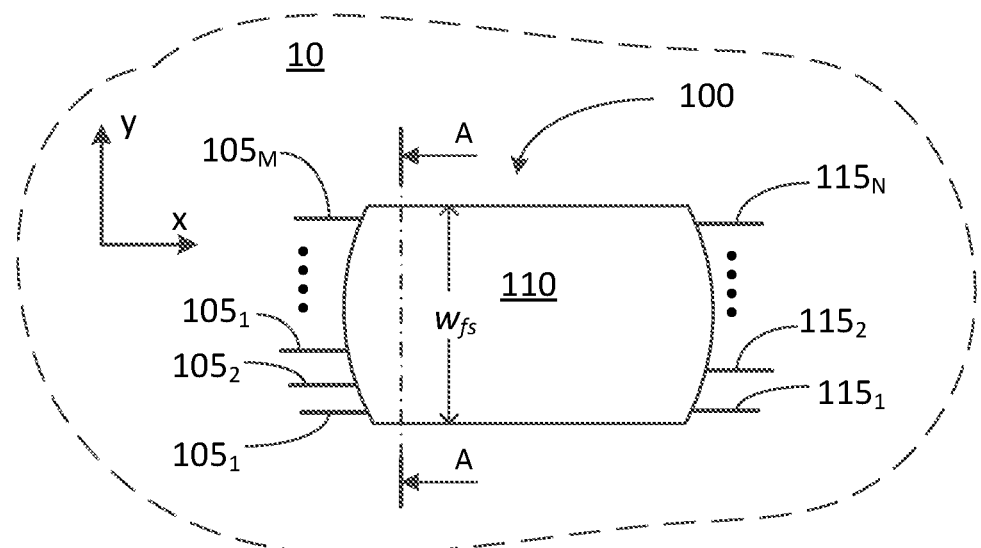
FIG. 1 is a schematic plan view of a PIC with a free-space coupling region having a thermally-compensating waveguiding stack as a core.

FIG. 1 schematically illustrates, in a plan view, an example photonic integrated circuit (PIC) 100 having an improved thermal stability. PIC 100, which may be formed in a photonic chip 10, includes an integrated free-space coupling region (FSCR) 110 and a plurality of optical planar waveguides 105, 115 extending from opposing sides thereof. The optical planar waveguides 105, 115 may be optically end-coupled to FSCR 110. In some embodiments the optical planar waveguides 105, 115 may be physically and optically end-coupled to FSCR 110. In some embodiments only one set of waveguides 105, 115 may be present. In the illustrated embodiment PIC 100 may function as an M×N star coupler that optically couples each of M≥1 waveguides 105 to each of N≥1 waveguides 115. Waveguides 105, 115 may be single-mode waveguides or multi-mode waveguides. FSCR 110 may be substantially in the form of a slab waveguide of width $w_{fs}$, which may vary along its length, e.g. along the x-axis in the illustrated embodiment. At least in some embodiments the FSCR width $w_{fs}$, as measured at some locations along its length, may greatly exceed the wavelength $\lambda$ of light in the operating wavelength range of the PIC. The operating wavelength range of PICs described in this disclosure may lie for example within the wavelength range of optical communications, e.g. between approximately 850 nm and approximately 1650 nm in vacuum. In such embodiments the propagation of light in the plane (x,y) of the PIC between waveguides 105 and 115 may be viewed substantially as free-space, i.e. neglecting effects of lateral confinement. However embodiments in which effects associated with some lateral confinement of light in FSCR 110 may affect PIC's performance are also within the scope of the present disclosure. In example embodiments, $w_{fs}$ may be greater than 50λ, or greater than 100λ. In at least some embodiments $w_{fs}$ may be as large as tens of microns, or may be greater than 100 microns.

When FSCR 110 is used as a star coupler, such as to couple a light signal from one waveguide into a plurality of waveguides, its performance may be relatively insensitive to thermal fluctuations or changes in environmental temperature. However in embodiments where light signals experience coherent mixing within FSCR 110, performance of PIC 100 may depend on an effective refractive index of the FSCR 110, and may thus, be more sensitive to variations in its temperature T. The term "effective refractive index" ($n_{eff}$) refers to a ratio of the speed of light in vacuum c to the speed of light propagation in a relevant section of the PIC under consideration, such as in an FSCR or a waveguide connecting thereto. Examples include embodiments or applications where mutually coherent optical signals are injected into FSCR 110 via two or more input waveguides, or where an input optical signal injected through one input waveguide experiences diffraction within FSCR 110, so that the fraction of light at an output is defined, at least in part, by coherent interference within FSCR 110. For example, when two or more waveguides 105 receive mutually coherent portions of a same light signal of a wavelength λ, the output signal intensity from any particular waveguide 115 at the wavelength λ may be a function of an effective refractive index $n_{eff}$ of FSCR 110, and may vary with temperature T if $n_{eff}$ is a function of temperature T.

In order to reduce temperature sensitivity of PIC 100 in interference-dependent applications, FSCR 110 may include a temperature-compensating stack of core layers as its waveguiding core. A waveguiding core comprising two or more stacked core layers may also be referred to as split core. Split-core devices, examples of which are described herein and in which different core layers are stacked one over the other in a direction normal to light propagation, differ from segmented-core devices, in which the core's layer structure varies along the propagation direction so that the wavefront crosses interfaces between segments as the light propagates from one segment to another in sequence.

Figure 2A:
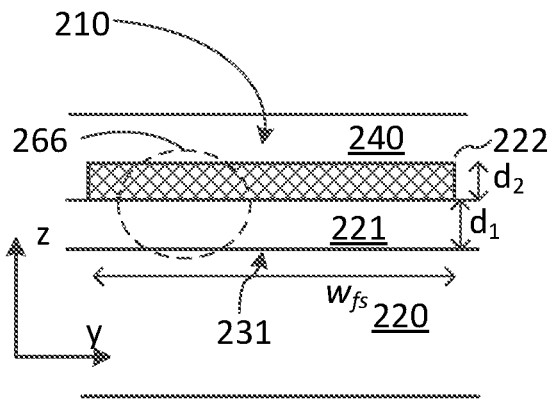
FIG. 2A is a schematic cross-sectional view of an integrated free-space coupling region formed with two thermally-compensating core layers of different widths.
Figure 2B:
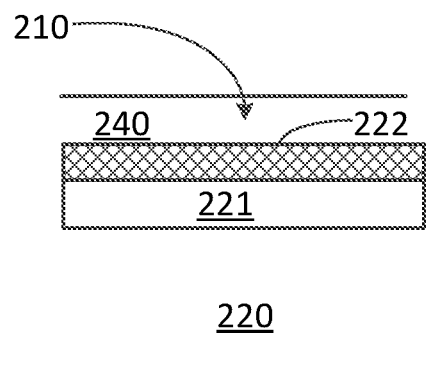
FIG. 2B is a schematic cross-sectional view of an integrated free-space coupling region formed with two thermally-compensating core layers of equal widths.

Referring to FIGS. 2A and 2B, there is illustrated a partial cross-sectional view of a FSCR 210 having a split waveguiding core, which is formed of two stacked core layers 221 and 222 that have thermo-optic coefficients of opposite signs. FSCR 210 may represent, for example, FSCR 110 of FIG. 1, and the cross-section of FIGS. 2A and 2B may correspond to a cross-section of FSCR 110 along the line "A-A" indicated in FIG. 1, or any other line drawn across FSCR 110 in the PIC plane (x,y). The term "thermo-optic coefficient" (TOC) here refers to the rate η of change of the refractive index n of the layer's material with temperature T, i.e. η=dn/dT. In some embodiments the first core layer 221 may have a positive TOC, and the second core layer 222 may have a negative TOC. In some embodiments the first core layer 221 may have a negative TOC, and the second core layer 222 may have a positive TOC.

The first core layer 221 may be deposited, or otherwise disposed, over a lower cladding 220, which may have a planar top surface 231. Cladding 220 may be disposed over a substrate, or be a part of a substrate. In some embodiments a top cladding layer 240 may be optionally provided over the second core layer 222. The lower cladding 220 may be disposed on a planar substrate (not shown). Claddings 220, 240 may have refractive indices that are smaller than the refractive indices of both the first core layer 221 and the second core layer 222, so as to vertically confine the optical mode 266 substantially within the cores layers 221, 222. The thicknesses $d_1$ and $d_2$ of the first and second core layers 221, 222, respectively, may be smaller than the wavelength λ of light in the respective layers in the operating wavelength range of the device. In some embodiments the thicknesses $d_1$ and $d_2$ of the first and second core layers 221, 222, respectively, may be smaller than a micron. The thickness of cladding 220, and cladding 240 when present, is typically greater than the wavelength λ, and may be greater than about 1.5 microns, typically a few microns thick. In some embodiments the thicknesses $d_1$ and $d_2$ may be selected to support the propagation of a single vertical transverse mode, i.e. the mode defined by the optical field distribution in the direction perpendicular to the plane of the PIC (z-axis in FIGS. 2A, 2B) and perpendicular to the propagation direction. The optical mode 266 is schematically indicated in FIG. 2A may correspond to an optical field distribution for light injected into the FSCR through an input waveguide, such as one of waveguides 105 shown in FIG. 1.

Relative thicknesses of the first and second core layers 221, 222 may be selected so that an increase in the refractive index of one of the core layers 221, 222 due to a change in temperature is at least partially compensated by a corresponding decrease in the refractive index of the other of the core layers 221, 222, so that the effective refractive index $n_{eff}$ "felt" by the optical mode 266 remains substantially unchanged, or its sensitivity to temperature variations is reduced by at least 3 times, or at least 5 times, or at least 10 times. Accordingly, athermal or nearly athermal operation of PIC 100 may be achieved.

Figure 2C:
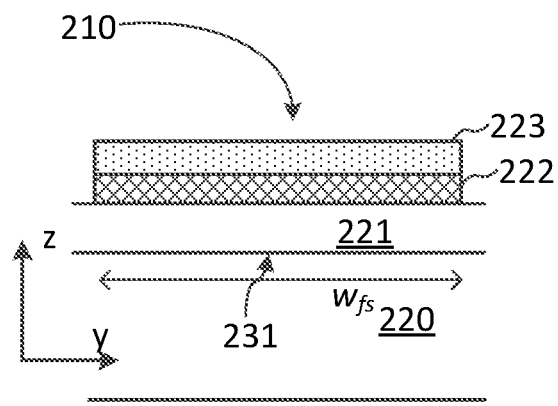
FIG. 2C is a schematic cross-sectional view of an integrated free-space coupling region having three thermally-compensating core layers.

FIG. 2A illustrates an embodiment in which the first core layer 221 has a width that is greater than the width $w_{fs}$ of the second core layer 222, and extends beyond the area of FSCR 210 in the plane (x,y) of the PIC. FIG. 2B illustrates an embodiment in which the first and second core layers 221, 222 have substantially the same width and cover substantially the same area. FIG. 2C illustrates an embodiment similar to that illustrated in FIG. 2A, but with a third core layer 223 disposed over the second core 222 to form a three-layer stack of core layers. In this embodiment one of the three core layers 221, 222, or 223 has a TOC that is opposite in sign than the other two core layers of the stack.

The structure of FIG. 2A may be fabricated, for example, by sequentially depositing layers 221 and 222 over the lower cladding 220, and then selectively etching away the second core layer 222 outside of the FSCR area, leaving at least a certain thickness of the first core layer 221 outside of the FSCR area intact. Alternatively, the structure of FIG. 2B may be fabricated, for example, by sequentially depositing layers 221 and 222 over the lower cladding 220, and then selectively etching away the first and second core layers 221, 222 outside of the FSCR area down to the cladding.

Embodiments, in which only a top portion of the first core layer 221 is absent, e.g. removed, outside of FSCR 210 so that a thinned first core layer 221 extends outside of FSCR 210, and/or in which only a top portion of the second core layer 222 is absent, e.g. removed, outside of FSCR 210, so that a thinned second core layer 222 extends outside of FSCR 210, are also within the scope of the present disclosure.

Figure 2D:
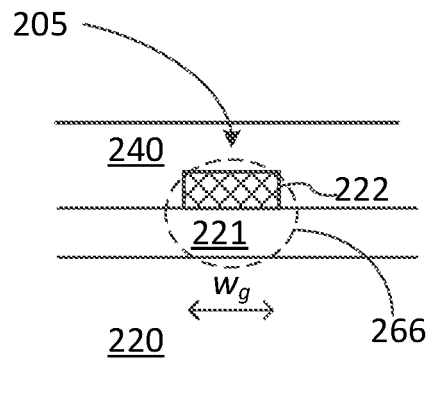
FIG. 2D is a schematic cross-sectional view of a strip-loaded waveguide formed with two thermally-compensating core layers.
Figure 2E:
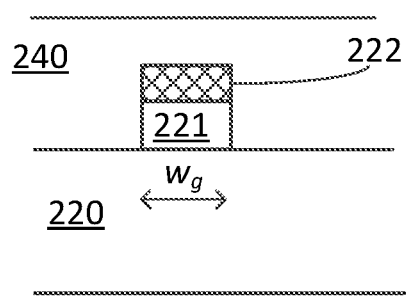
FIG. 2E is a schematic cross-sectional view of a ridge channel waveguide formed with two thermally-compensating core layers.

Referring to FIGS. 2D and 2E, in various embodiments the PIC includes one or more optical planar waveguides 205 that optically end-connect to FSCR 210, and those waveguides may also comprise the two core layers 221, 222 having opposite-sign TOCs. The waveguide 205 is shown in cross-section, and may correspond, for example, to one or more of the waveguides 105 or 115 of FIG. 1. The waveguide 205 has a width $w_g$ that is much smaller than $w_{fs}$, and may be for example equal or be smaller than the operating optical wavelength λ to support single optical lateral mode operation, but may also be greater than said λ in some other embodiments. FIG. 2D illustrates an embodiment where waveguide 205 is a strip-loaded waveguide, with the second core layer 222 having the width $w_g$, while the first core layer 221 extends laterally beyond the width $w_g$ of the waveguide. FIG. 2E illustrates an embodiment where waveguide 205 is a channel waveguide, with the first and second core layers 221, 222 having the same width $w_g$.

Figure 3A:
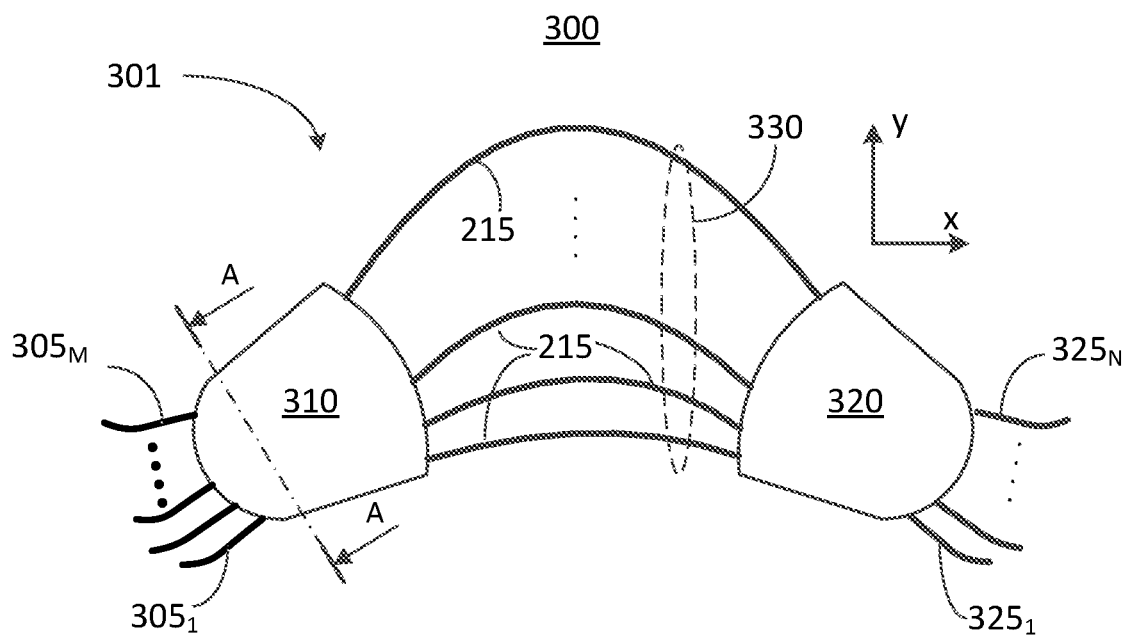
FIG. 3A is a schematic plan view of an integrated MUX/DEMUX device including an array waveguide grating (AWG) operating in transmission, with a coupling region or regions having a thermally-compensated waveguiding stack as a core.

Referring to FIG. 3A, there is shown a layout of a PIC 300 implementing an array waveguide grating (AWG) device 301 that may function as a wavelength multiplexer (MUX) or wavelength demultiplexer (DEMUX) with reduced temperature sensitivity. The AWG device 301 includes two FSCRs 310 and 320 that are connected by an array 330 of waveguides 215 of different lengths. In some implementations the optical path lengths may vary by the same amount between adjacent ones of the waveguides. In some implementations the optical path lengths may vary by different amounts between adjacent waveguides. M input waveguides 305 connect to the input side of the first FSCR 310, and N output waveguides 325 connect to the output side of the second FSCR 320. In a wavelength MUX configuration the number M of input waveguides 305 is greater than one, while the number N of output waveguides 325 may be equal to one, or only one of the output waveguides 325 may be used during operation. In a wavelength DEMUX configuration the number N of output waveguides 325 is greater than one, while the number M of input waveguides 305 may be equal to one, or only one of the input waveguides 305 may be used during operation.

In order to support athermal or approximately athermal operation, at least one of the first FSCR 310 and the second FSCR 320 may be as described above with reference to FIGS. 2A and 2B, comprising the vertically split core where the second core layer 222 is disposed over the first core layer 221 and has a TOC of the opposite sign. In some embodiments where the AWG device 301 is a DEMUX, at least the second FSCR 320 may comprise the two core layers 221 and 222 as described above. In some embodiments, for example where the AWG device 301 is a MUX, at least the first FSCR 310 may comprise the two core layers 221 and 222 of opposite TOC as described above. In some embodiments both the first FSCR 310 and the second FSCR 320 may comprise the two core layers 221 and 222 of opposite-sign TOC as described above. In some embodiments AWG waveguides 215 may comprise a split core with two core layers of opposite-sign TOC, as described above with reference to FIGS. 2C and 2D. By suitably selecting the thicknesses of the two core layers, their optical path lengths may remain substantially independent, or only weakly-dependent, on temperature.

Figure 3B:
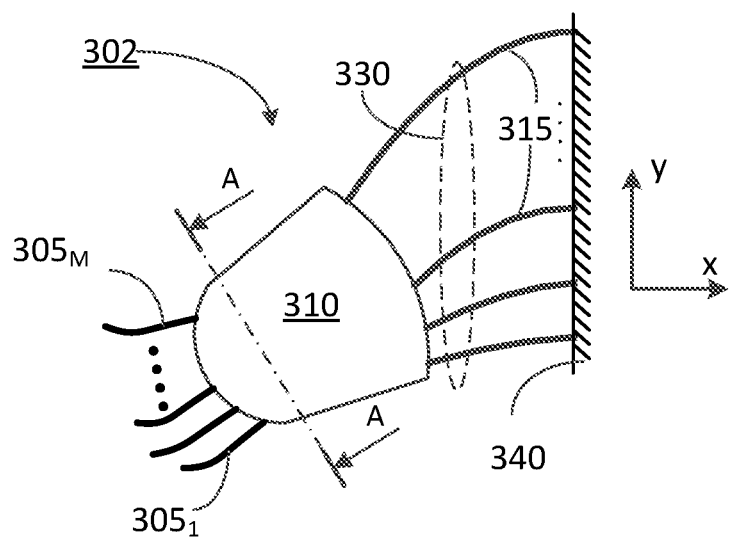
FIG. 3B is a schematic plan view of an integrated MUX/DEMUX device including a reflective AWG with a free-space coupling region having a thermally-compensated waveguiding stack as a core.

FIG. 3B illustrates an AWG device 302 that may be viewed as a modification of the AWG device 301 of FIG. 3A configured to operate in reflection. Here the second FSCR 320 is replaced with a reflector 340, so that light that is coupled via the first FSCR 310 into the AWG waveguides 315 is reflected back toward the first FSCR 310, and then is collected into one or more waveguides 305. The AWG device 302 may be configured, for example, to operate in a wavelength MUX mode or a wavelength DEMUX mode. For example, in wavelength DEMUX mode one of the optical planar waveguides 305 may function as an input to the DEMUX and others of the optical planar waveguides 305 may function as outputs of the DEMUX; in optical wavelength MUX mode, the roles of input and output of the optical wavelength DEMUX are reversed. As described above, the first FSCR 310 may comprise two core layers 221, 222 having opposite-sign TOCs and thicknesses suitable to support temperature-compensated operation with a reduced sensitivity to temperature changes.

Figure 4:
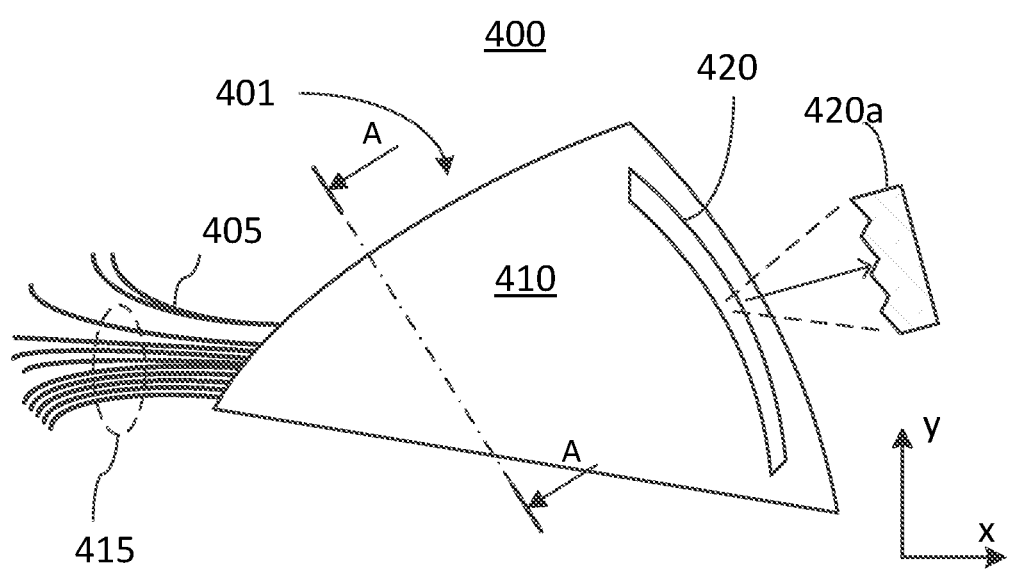
FIG. 4 is a schematic plan view of an integrated echelle grating device including a reflective grating in a free-space coupling region having a thermally-compensated waveguiding stack as a core.

FIG. 4 illustrates a PIC 400 that implements a wavelength routing device 401 including an FSCR 410 and a diffraction grating 420. Grating 420 may be disposed within or facing FSCR 410, for example at an edge thereof. Grating 420 may be, for example, an echelle grating (EG). In the illustrated embodiments grating 420 is configured to operate in reflection; however embodiments in which grating 420 operates in transmission may also be envisioned and are within the scope of the present disclosure. FSCR 410 is configured with a thermally compensated split core to support athermal or approximately athermal operation of the PIC 400 at operating wavelengths. Similarly to AWG devices 301 and 302, the wavelength routing device 401 may function as a wavelength multiplexer (MUX) or wavelength demultiplexer (DEMUX), but may, e.g., have a smaller footprint. One or more first optical planar waveguides 405 that optically end-connect to FSCR 410, and a plurality of second optical planar waveguides 415 also optically end-connect to FSCR 410. In FIG. 4, a reflective embodiment of the diffraction grating 420 is illustrated as being disposed within FSCR 410, e.g., near an edge thereof. In FIG. 4, the diffraction grating 420 optically couples the one or more first waveguides 405 to the plurality of second waveguides 415 by means of diffraction at the diffraction grating 420; an expanded portion 420a of the reflective embodiment of the diffraction grating 420 is also shown schematically in FIG. 4 for illustration. The second waveguides 415 optically end-connect to an edge of FSCR 410 at slightly different locations and are optically coupled to the first waveguide at different operating wavelengths of light, for example, for different wavelength channels of a particular wavelength-multiplexing scheme.

In embodiments where the wavelength routing device 401 is used as a wavelength DEMUX, input wavelength-multiplexed light is injected into FSCR 410 via the first waveguide(s) 405, and the second waveguides 415 collect the light of different ones of the wavelength channels of the input wavelength-multiplexed light due to the dispersive wavelength-demultiplexing performed by grating 420. The operation of device 401 may be reversed to function as a wavelength MUX. In such embodiments second waveguides 415 may separately inject light of different wavelength channels into FSCR 410, and one or more of the first waveguides 405 may receive multiple ones of the wavelength channels due to wavelength-multiplexing action of grating 420.

The wavelength $\lambda_n$ of light at which a particular one of the second waveguides 415 is coupled to the first waveguide 405 is a function of the effective refractive index of FSCR 410, and thus may generally vary with temperature. To eliminate or at least substantially reduce such temperature dependence, and to support athermal or approximately athermal operation, FSCR 410 may comprise two vertically stacked, optical core layers 221, 222 having opposite-sign TOCs as described above with reference to FIGS. 2A and 2B.

Approaches, techniques, and principles described above may be applied to various material systems to implement different photonic integrated circuits and devices that utilize interferometric effects, including but not limited to wavelength multiplexers/demultiplexers. Example PICs in which aspects of the present disclosure may be used include PICs formed with lithium niobate (LiNbO3, LN) waveguides, such as those based on LN on isolator (LNOI) material system. An LNOI-based photonic chip may comprise a thin, for example sub-micron, LN layer disposed over a buried low-index insulating layer. Such structures may be produced for example by ion slicing of a bulk LN crystal to obtain a thin LN film, and bonding the LN film to a low-index insulating layer on top of a support substrate, for example using benzocyclobutene (BCB) or crystal bonding.

Figure 5A:
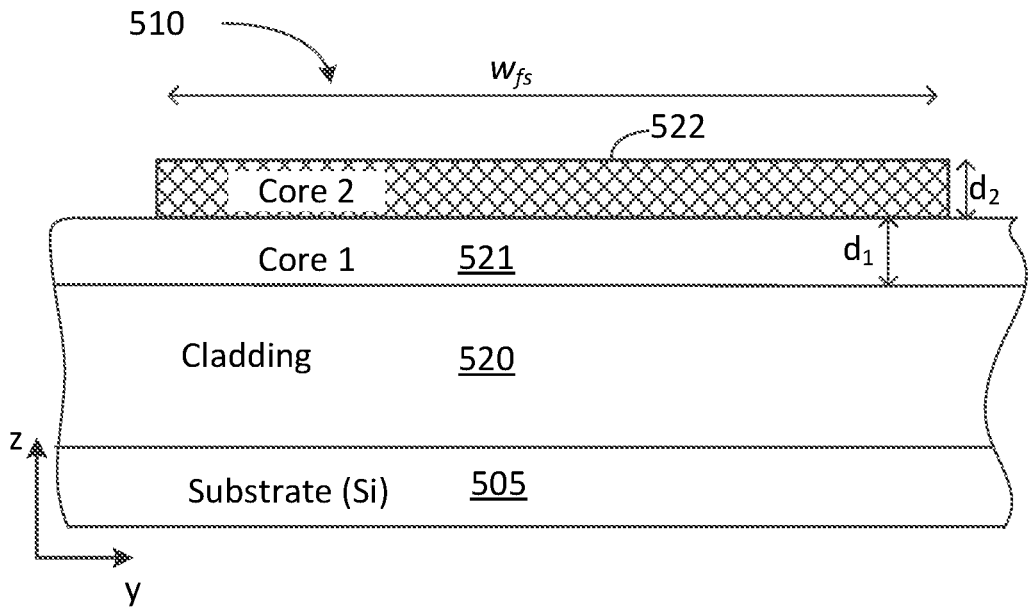
FIG. 5A is a schematic cross-sectional view of an integrated free-space coupling region implemented in a LNOI-based PIC with a thermally-compensating second core layer disposed over a wider LN layer.
Figure 5B:
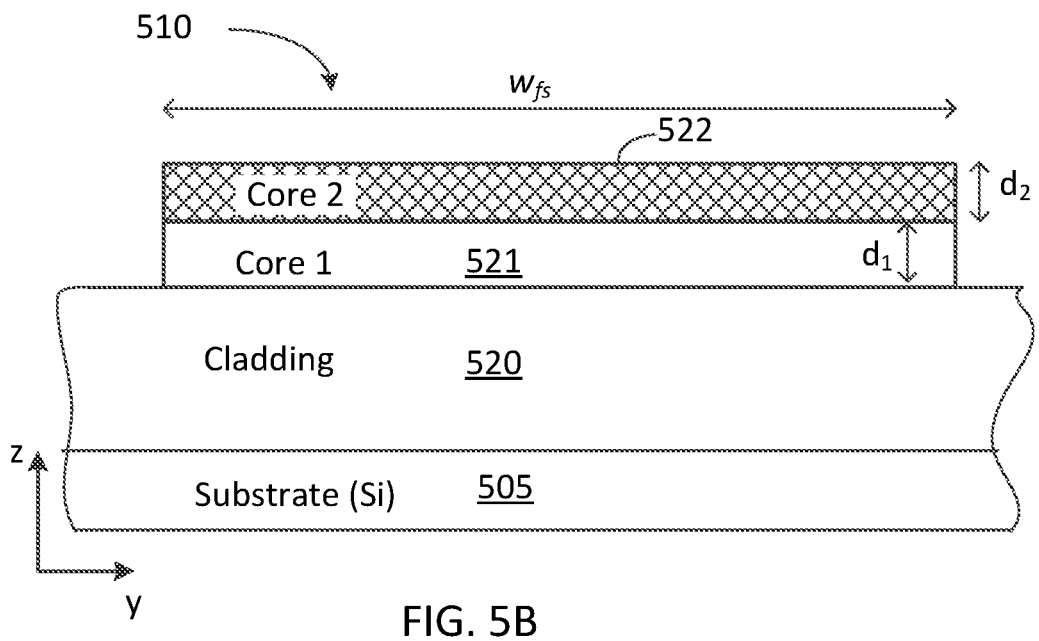
FIG. 5B is a schematic cross-sectional view of an embodiments of the structure of FIG. 5A with the thermally-compensating second core layer overlapping the LN layer of matching width.

FIGS. 5A and 5B illustrate cross-sections of an example thermally-compensated FSCR 510 fabricated on a silicon (Si) substrate with two core layers of same (FIG. 5B) and different (FIG. 5A) widths having opposite-sign TOC. The thermally-compensated FSCR 510 may be a part of a PIC implementing any of the integrated wavelength routing devices, such as wavelength MUX/DEMUX, described above with reference to FIGS. 1-4, and may embody any one or more of FSCR 110, FSCR 210, FSCR 310, FSCR 320, or FSCR 410. The example FSCR 510 includes a substrate 505, a first cladding layer 520 disposed over the substrate 505, a first core layer of FSCR 510, and a second core layer 522 having a TOC that is opposite in sign to that of the first core layer 521. The first cladding layer 520 may also be viewed as a part of the substrate 505 adjacent the first cladding. A second cladding layer (not shown) may be optionally provided over the second core layer 522, and may be formed of the same low-index material as the first cladding layer 520 or may be formed of a different low-index material. In some embodiments additional layers may be present, for example between the substrate 505 and the lower cladding 520, or above the top cladding when present.

The thickness $d_2$ of the second core layer 522 may be selected as a function of the thickness $d_1$ of the first core layer 521 and material properties of the core layers, as the person of ordinary skill would understand based on the present disclosure. For example, in the two core layers, the refractive indices $n_i$ and TOCs $\eta_i$, i=1, 2, so that an effective TOC $\eta_{eff}$ of the corresponding split-core waveguide 522/521, $\eta_{eff}=dn_{eff}/dT$, is at least 3 times smaller in magnitude, or at least 5 times smaller, or at least 10 times smaller, than the TOCs $\eta_i$ of the materials of either of the first and second core layers 521, 522.

In embodiments of FIG. 5A, the second core layer 522 is selectively patterned, for example by dry or wet etching down to the first core layer 521, to define an island of width $w_{fs}$ that is shaped in the plane of the PIC in accordance with a desired FSCR layout, such as the example FSCR layouts schematically illustrated in FIGS. 1, 3A, 3B, and 4, or any suitable variation of these layouts. The term "plane of the PIC" refers to the plane of light propagation in the PIC, or the plane of PIC layout, which is orthogonal to the plane of FIGS. 5A and 5B. The width $w_{fs}$ of the second core layer 522, which defines the FSCR width at some cross-section thereof, may be much greater than the wavelength $\lambda$ of optical signals therein in the operating wavelength range, and may be as large as tens or even hundreds or thousands of microns. In the embodiments of FIG. 5A, the first core layer 521 remains unpatterned and extends outside of the area of FSCR 510. In the embodiments of FIG. 5B, both core layers 521, 522 are absent outside of the area defined by the layout of FSCR 510. Embodiments in which a top portion of the first core layer 521 is removed outside of FSCR 510 so that a thinned core layer 521 extends outside of FSCR 510, or in which only a top portion of the second core layer 522 is removed outside of FSCR 510 so that a thinned second core layer 522 extends outside of FSCR 510, are also within the scope of the present disclosure.

The split-core structures of the type illustrated in FIGS. 5A and 5B may be implemented using a variety of materials and material systems. For example, in some embodiments, the first core layer 521 may be a layer of Lithium Niobate (LiNbO3, LN), and the second core layer 522 may be a layer of titanium dioxide ($TiO_2$) or another suitable material having a TOC of the sign that is opposite to the sign of LN TOC, including but not limited to $BaF_2$, $CaF_2$, $MgF_2$, and/or polymer materials such as poly-methyl methacrylate (PMMA) and epoxy-based negative photoresist, e.g. SU-8, as non-limiting examples. The first cladding layer 520 may be, for example, a layer of silica (SiO2). In a variation of such embodiments, the substrate 505 may be an LN substrate. In other embodiments, the first core layer 521 may be a layer of germanium doped silica (SiO2:Ge) disposed over a silica cladding layer 520, and the second core layer 522 may be a layer of a suitable polymer material such as PMMA or SU-8. In other embodiments, the first core layer 521 may be a layer of silicon (Si) disposed over a silica (SiO2) cladding layer 520, and the second core layer 522 may be a layer of TiO2, or a layer of SU-8 polymer, as non-limiting examples.

Using thermally-compensated multi-layer waveguiding cores in wavelength routing devices, e.g. MUX/DEMUX, as described above, may enable reducing the wavelength shift of a relevant transfer function of the device by a factor of 3 or greater, or by a factor or 5 or greater. By way of example, for a wavelength routing device, such as MUX/DEMUX, implemented with a silicon core layer, having a second core layer of a suitable negative-TOC material may reduce a temperature shift of its transfer function from about 10 GHz/K to about 3 GHz/K or less, or to about 1 GHz/K or less. Further by way of example, for a wavelength routing device such as MUX/DEMUX implemented with a core layer of germanium dope silica (SiO2:Ge) disposed over a silica (SiO2) cladding layer, having a second core layer of a suitable negative-TOC material, such as for example a suitable polymer, e.g. PMMA, may reduce a temperature shift of its transfer function from about 1 GHz/K to about 0.3 GHz/K or less, or to about 0.1 GHz/K or less. Further by way of example, for a wavelength routing device such as MUX/DEMUX implemented with an LN core layer LN disposed over a silica cladding layer, adding a second core layer of a suitable negative-TOC material such as TiO2 may reduce a temperature shift of its transfer function from about 3 GHz/K to about 1 GHz/K or less, or to about 0.3 GHz/K or less.

For example, simulations show that, for an integrated interferometric device such as for example one of devices described above with reference to FIGS. 3A-4, or similar, which has a LN/TiO2 two-core structure described above, with the first core layer 521 of LN material having the refractive index $n_1 \cong 2.21$, TOC $\eta_1 \cong 4 \cdot 10^{-5}$ [$K^{-1}$], and thickness $d_1$ of about 400 nm, and the second core layer 522 of TiO2 with the refractive index $n_2 \cong 2.18$, TOC $\eta_2 \cong -2 \cdot 10^{-4}$ [$K^{-1}$], and the thickness $d_2$ of about 200 nm, the use of the second negative-TOC layer may reduce the temperature shift of the device transfer function, by a factor of 13, i.e. to about 0.25 GHz/K at optical fiber communication wavelengths at room temperature, instead of approximately 3 GHz/K as might be achieved in an equivalent waveguide structure with a single-layer LN core. The transfer function of an optical device, such as MUX or DEMUX, describes a ratio of an output optical power to an input optical power, as a function of wavelength, for particular input/output ports or waveguides.

Any of the example embodiments described above may be fabricated, for example by processing a wafer having two or more core layers of opposite-sign TOCs disposed over a cladding layer, and then patterning at least the top cladding layer to define one or more FSCRs and a plurality of waveguides connected thereto. In such embodiments, each of the respective elements of the PIC layout, including the one or more FSCRs and the plurality of waveguides connected thereto, may include different portions of the two core layers. In other embodiments one or more of the two core layers may be of different materials in different elements of the PIC layout, such as for example in two different FSCRs or in an FSCR and one or more waveguides connected thereto.

Some degree of athermal behavior may be produced by using a core layer and a cladding layer having TOCs of opposite sign. That is, such structures may provide a certain reduction in the temperature dependence of the effective refractive index 'sensed' by light propagating therein. However, such structures may be sensitive to polarization of light, with the TE and TM modes behaving differently. In contrast, the split-core structures of embodiments described herein may have the advantage of being less sensitive to polarization.

The present disclosure is not to be limited in scope by the specific embodiments described herein. Indeed, other various embodiments and modifications, in addition to those described herein, will be apparent to those of ordinary skill in the art from the foregoing description and accompanying drawings. For example, in some embodiments the waveguiding core may include more than two core layers, with at least two of them having TOCs of opposite signs, including but not limited to vertical stack of core layers with TOCs of alternating signs. In another example, integrated optical devices similar to those described herein may use material systems other than SOI or LNOI, including but not limited to those utilizing silica, other dielectric materials, silicon, compound semiconductor materials, other semiconductor materials, or polymers for fabricating waveguiding cores. Referring to FIGS. 2A, 2B, 5A, and 5B, non-limiting examples may include the first core layer 221 or 521 comprising Ge-doped $SiO_2$ and the second core layer 222 or 522 comprising poly-methyl methacrylate (PMMA), the first core layer 221 or 521 comprising silicon nitride (SiN) and the second core layer 222 or 522 comprising an epoxy-based negative photoresist such as SU-8, the first core layer 221 or 521 comprising silicon (Si) and the second core layer 222 or 522 comprising $TiO_2$; these structures may utilize suitable substrates and cladding layers, including but not limited to SiO2 cladding layers on Si substrates.

Furthermore, features described with reference to a particular example embodiment may also be used in other embodiments. All such and other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A photonic integrated circuit (PIC), comprising:
a substrate having a planar surface;
a first free-space coupling region located along the planar surface, the first free-space coupling region comprising a vertical stack of two or more adjacent optical core layers over the planar surface and an optical cladding layer over the vertical stack and the substrate, the optical cladding layer being adjacent the vertical stack; and
a plurality of optical planar waveguides being physically and optically end-connected to the first free-space coupling region and located along the planar surface;
wherein two of the adjacent optical core layers have thermo-optic coefficients of opposite sign.

2. The PIC of claim 1, further comprising a second free-space coupling region located along the planar surface, wherein the plurality of optical planar waveguides comprises a planar optical waveguide array optically connecting the first free-space coupling region to the second free-space coupling region.

3. The PIC of claim 2 further comprising at least one output waveguide being physically and optically end-coupled to the second free-space coupling region and having an end facing ends of the waveguides of the planar optical waveguide array.

4. The PIC of claim 2 wherein the waveguide array comprises waveguides of different lengths to form an array waveguide grating (AWG).

5. The PIC of claim 2 wherein the second free-space coupling region comprises a vertical stack of two or more adjacent optical core layers having thermo-optic coefficients of opposite sign.

6. The PIC of claim 2 wherein at least one waveguide of the waveguide array comprises two adjacent optical core layers having thermo-optic coefficients of opposite sign.

7. A photonic integrated circuit (PIC), comprising:
a substrate having a planar surface;
a first free-space coupling region located along the planar surface, the first free-space coupling region comprising a vertical stack of two or more adjacent optical core layers over the planar surface; and
a plurality of optical planar waveguides being physically and optically end-connected to the first free-space coupling region and located along the planar surface;
wherein two of the adjacent optical core layers have thermo-optic coefficients of opposite sign; and
wherein the first free-space coupling region comprises a diffraction grating, and wherein the plurality of optical planar waveguides comprises at least one first waveguide and a plurality of second waveguides, wherein the diffraction grating is configured to optically couple individual ones of the second waveguides to the first waveguide at different wavelengths.

8. The PIC of claim 1 wherein one of the two adjacent optical core layers extends beyond the first free-space coupling region.

9. A photonic integrated circuit (PIC), comprising:
a substrate having a planar surface;
a first free-space coupling region located along the planar surface, the first free-space coupling region comprising a vertical stack of two or more adjacent optical core layers over the planar surface; and
a plurality of optical planar waveguides being physically and optically end-connected to the first free-space coupling region and located along the planar surface;
wherein two of the adjacent optical core layers have thermo-optic coefficients of opposite sign; and
wherein at least one of the plurality of optical planar waveguides comprises a vertical stack of two adjacent core layers of differing widths to define a strip-loaded waveguide and having thermo-optic coefficients of opposite signs.

10. The PIC of claim 1 wherein the vertical stack comprises at least three optical core layers.

11. A photonic integrated circuit (PIC), comprising:
a substrate having a planar surface;
a first free-space coupling region located along the planar surface, the first free-space coupling region comprising a vertical stack of two or more adjacent optical core layers over the planar surface; and
a plurality of optical planar waveguides being physically and optically end-connected to the first free-space coupling region and located along the planar surface;
wherein two of the adjacent optical core layers have thermo-optic coefficients of opposite sign; and
wherein one of the two adjacent optical core layers comprises lithium niobate (LiNbO3).

12. The PIC of claim 11 wherein the other of the two adjacent optical core layers comprises titanium dioxide (TiO2).

13. The PIC of claim 11 configured to function as a wavelength-selective optical routing device having a transmission function that shifts by less than 1 GHz per temperature change of one degree Kelvin in an operating wavelength range of the PIC at room temperature.

14. A photonic integrated circuit (PIC), comprising:
a substrate having a planar surface;
a first free-space coupling region located along the planar surface, the first free-space coupling region comprising a vertical stack of two or more adjacent optical core layers over the planar surface; and
a plurality of optical planar waveguides being physically and optically end-connected to the first free-space coupling region and located along the planar surface;
wherein two of the adjacent optical core layers have thermo-optic coefficients of opposite sign; and
wherein one of the two adjacent optical core layers comprises silicon.

15. The PIC of claim 14 wherein the other of the two adjacent optical core layers comprises at least one of titanium dioxide (TiO2) or a polymer material having a negative thermo-optic coefficient.

16. The PIC of claim 14 configured to function as a wavelength-selective optical routing device having a transmission function that shifts by less than 3 GHz per temperature change of one degree Kelvin in an operating wavelength range of the PIC at room temperature.

17. A photonic integrated circuit (PIC), comprising:
a substrate having a planar surface;
a first free-space coupling region located along the planar surface, the first free-space coupling region comprising a vertical stack of two or more adjacent optical core layers over the planar surface; and
a plurality of optical planar waveguides being physically and optically end-connected to the first free-space coupling region and located along the planar surface;
wherein two of the adjacent optical core layers have thermo-optic coefficients of opposite sign; and
wherein one of the two adjacent optical core layers comprises germanium doped silica.

18. The PIC of claim 17 wherein the other of the two adjacent optical core layers comprises a polymer material having a negative thermo-optic coefficient.

19. The PIC of claim 14 configured to function as a wavelength-selective optical routing device having a transmission function that shifts by less than 0.3 GHz per temperature change of one degree Kelvin in an operating wavelength range of the PIC at room temperature.

20. A wavelength multiplexing/demultiplexing device, comprising:
a substrate;
a first cladding layer disposed over the substrate and having a planar surface;
a first core layer disposed over the planar surface of the first cladding layer and having a positive thermo-optic coefficient; and
a second core layer disposed over and in contact with the first core layer and having a negative thermo-optic coefficient;
a second optical cladding layer disposed over the first and second core layers and the first cladding layer, the optical cladding layer being adjacent the second core layer;
wherein at least the second core layer is patterned to define at least one free-space coupling region and a plurality of waveguides optically end-coupled thereto.

* * * * *